O K SNYDER.
STEERING WHEEL.
APPLICATION FILED FEB. 25, 1916.

1,299,048.

Patented Apr. 1, 1919.

Witness
L. W. Pate

Inventor
O. K. Snyder,
By Pagelsen & Spencer
Attorneys

UNITED STATES PATENT OFFICE.

O K SNYDER, OF ONAWAY, MICHIGAN.

STEERING-WHEEL.

1,299,048.  Specification of Letters Patent.  Patented Apr. 1, 1919.

Application filed February 25, 1916. Serial No. 80,335.

*To all whom it may concern:*

Be it known that I, O K SNYDER, a citizen of the United States, and residing at Onaway, in the county of Presque Isle and State of Michigan, have invented a new and Improved Steering-Wheel, of which the following is a specification.

This invention relates to steering wheels for motor vehicles and its object is to provide means for attaching the rim to the ends of the spider arms whereby greater strength is afforded than is obtained with ordinary constructions; also to provide a wheel wherein the cost of the rim fastening means is reduced; the invention further has reference to a process whereby the wheel may be manufactured.

Figure 1:
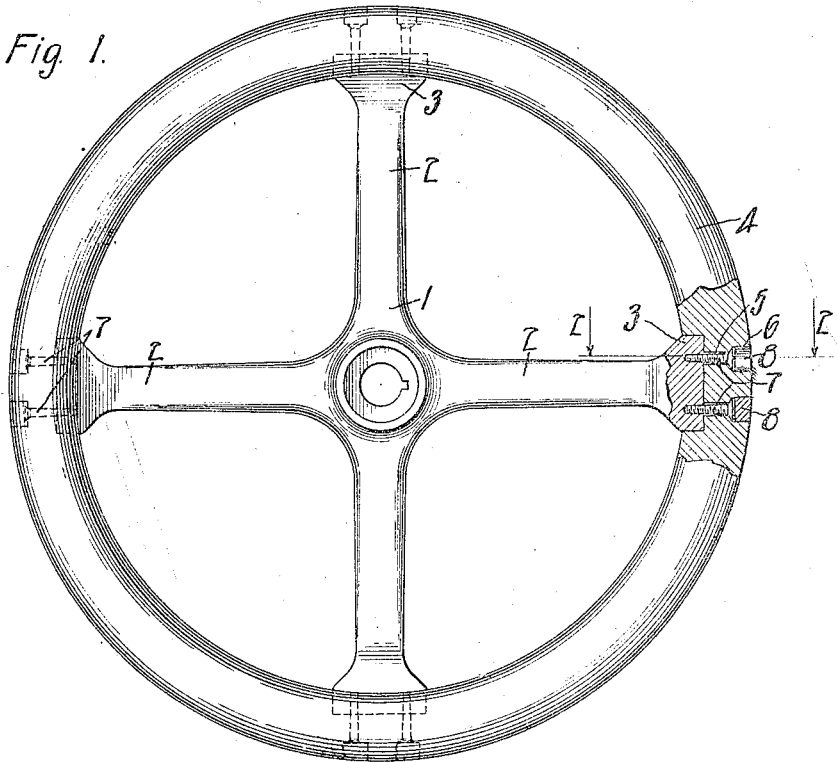
Figure 2:
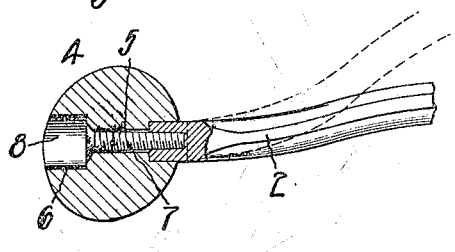

In the drawings, which illustrate one embodiment of the invention, Figure 1 is a plan view parts being broken away. Fig. 2 is a section on the line 2—2 of Fig. 1.

The spider 1 may be of any approved type and includes arms 2 which may be integral therewith or separate therefrom, and which may be arranged radially about the axis of the post or otherwise. The ends of the arms are preferably broadened as indicated at 3 to afford a wide bearing for the rim. The rim 4 is of the usual circular form and may be made of wood or other suitable material.

At points corresponding to the location of the spider arms, the rim is mortised or socketed circumferentially on its inner face to tightly receive the flattened end 3 of the arms, and is bored through transversely, that is, substantially in the plane of the wheel, as indicated at 5, the outer ends 6 of the holes being enlarged. In assembling the rim and spider shown, wherein the arms are integral with the central portion of the spider, the spider is placed in a suitable press (not shown) and its central portion is forced upwardly (or the outer ends of the arms are forced downwardly) with reference to the outer ends of the arms, as shown in dashed lines in Fig. 2, which draws the ends of the arms inwardly so as to allow the rim to be placed over said ends with the sockets in alinement therewith, after which a reversal of the press causes the ends to be projected into the openings in the rim. Screws 7, preferably two for each arm, are then passed through the openings 5—6 and threaded into the ends of the arms until the parts are drawn tightly together, whereupon the enlarged outer ends of the openings are closed by glued plugs 8, preferably of the same material as the rest of the rim. It will be understood that in those instances in which the arms are not integral with the rest of the spider, the parts may be assembled in other ways, and it is also clear that the spider may be formed in the shape indicated by the dashed lines and have its arms afterward projected into the slots or sockets.

The relation of sockets and arms 2 is of much importance in that the material of the rim is continuous both above and below the ends of the arms and in that no plug is necessary to partly close the socket. The relation of sockets and screw holes 5—6 is also important, both in reference to steps of manufacture and finished article, since the holes and the sockets may all be formed in a single operation by a properly designed machine, and since the ends of the arms are firmly held against movement in any direction.

The details of the wheel may be changed considerably without departing from the spirit of the invention, as is obvious, and I do not, therefore, wish to be limited except as indicated by the subjoined claims.

I claim:—

1. The herein described method of combining a solid non-metallic rim and a spider having substantially dished arms to form a steering wheel, consisting in forming in the solid non-metallic rim a series of recesses opening through the inner surface of the rim and otherwise of solid wall limitation, forming the terminals of the spider arms to accurately correspond in size and shape to the recesses, and at right angles to the axis of the spider, arranging the spider with the formed terminals in line with the recesses, and spreading the arms of the spider to force the terminals into the recesses to completely fill the same.

2. A steering wheel comprising a solid wooden rim and a metallic spider, said rim being formed with recesses opening only through the inner surface of the rim and being of substantial dimensions circumferentially and transversely of the rim, the spider arms having terminals fitted into the recesses, said terminals being arranged at right angles to the axis of the spider and of a size and shape to completely fill the recesses, whereby the strain of use of the wheel is distributed through a very considerable area of the interior of the rim.

O K SNYDER.